United States Patent [19]

Asai et al.

[11] Patent Number: 4,666,770

[45] Date of Patent: May 19, 1987

[54] MAGNETIC RECORDING MEDIUM

[75] Inventors: Takamitsu Asai; Masaaki Fujiyama, both of Odawara, Japan

[73] Assignee: Fuji Photo Film Co., Ltd., Minami-ashigara, Japan

[21] Appl. No.: 753,829

[22] Filed: Jul. 11, 1985

[30] Foreign Application Priority Data

Jul. 12, 1984 [JP] Japan .................. 59-143267

[51] Int. Cl.$^4$ .............................................. G11B 5/70
[52] U.S. Cl. ................................. 428/323; 428/694; 428/900
[58] Field of Search ............... 428/694, 900, 328, 323; 427/128

[56] References Cited

U.S. PATENT DOCUMENTS

| | | | |
|---|---|---|---|
| 4,396,659 | 8/1983 | Shibata et al. | 428/694 |
| 4,442,159 | 4/1984 | Dezawa et al. | 427/128 |
| 4,486,496 | 12/1984 | Dezawa et al. | 428/328 |
| 4,515,856 | 5/1985 | Matsumoto | 428/694 |
| 4,547,425 | 10/1985 | Naruse | 428/694 |
| 4,552,808 | 11/1985 | Fujiyama et al. | 428/694 |
| 4,565,726 | 1/1986 | Oguchi et al. | 428/694 |
| 4,585,697 | 4/1986 | Kato et al. | 428/900 |
| 4,605,597 | 8/1986 | Ogawa et al. | 428/694 |

*Primary Examiner*—Paul J. Thibodeau
*Attorney, Agent, or Firm*—Armstrong, Nikaido, Marmelstein & Kubovcik

[57] ABSTRACT

A magnetic recording medium having an improved surface smoothness of the coating layer, improved degree of orientation in a magnetic field and increased output is provided which comprises a non-magnetic support and a magnetic recording layer provided thereon containing a ferromagnetic substance of plate-shaped hexagonal system, and having a surface gloss value of 180% or more.

11 Claims, No Drawings

MAGNETIC RECORDING MEDIUM

BACKGROUND OF THE INVENTION

1. Field of the Invention

This invention relates to a magnetic recording medium and more particularly, it is concerned with a magnetic recording medium in which the surface smoothness of the coating, the degree of orientation in a magnetic field and the reproducing output are improved by improving the dispersion of a coating composition, shortening the dispering time and raising the stability of a coating composition during passage of time.

2. Description of the Prior Art

Up to the present time, magnetic recording media have widely been used for magnetic recording and reproducing, which are obtained by dispersing a ferromagnetic substance consisting of acicular crystals of $\gamma$-$Fe_2O_3$ or $CrO_2$ in a binder and coating the resulting coating composition onto a non-magnetic support. Lately, however, improvement of the recording density has eagerly been desired so as to achieve the enlargement of a recording capacity and the miniaturization, but it is necessary to make the maximum size of an acicular magnetic grain sufficiently smaller than a recording wavelength or recording bit length in order to obtain a recording medium suitable for high density recording using an acicular magnetic powder as in the prior art. At the present time, an acicular magnetic powder with a size of about 0.3 $\mu$m has been put to practical use to obtain a shortest recording wavelength of about 1 $\mu$m.

For the purpose of obtaining a medium whereby a further high density recording is made possible in future, it will be required to make further small the size of an acicular magnetic powder. In such a small acicular magnetic powder, however, the thickness is extremely fine, e.g. 100 Å or less and the grain volume is very small, e.g. $10^{-17}$ $cm^3$ or less, which result in the problem that the magnetic properties are deteriorated by thermal agitation or surface effects and a sufficient orientation cannot be obtained even if a magnetic field is applied to the magnetic coating film.

In a magnetic recording medium coated with a coating composition in which an acicular magnetic substance having an acicular ratio (long axis/short axis) of more than 10 is dispersed, the direction of coating due to the acicular shape remains so that in the case of using the magnetic recording medium by rotating in the form of a disk, an output fluctuation occurs with its rotation period.

Accordingly, there have hitherto been proposed magnetic recording media each using, as a ferromagnetic substance, hexagonal ferrite which is plate-shaped and has the axis of easy magnetization in the vertical direction to the plate surface, and each being subjected to magnetic orientation in the longitudinal direction in the plane of the recording medium (Japanese Patent Application OPI (Kokai) Nos. 6525/1983 and 6526/1983). However, it is difficult to increase the dispersion of a ferromagnetic substance of plate-shaped hexagonal crystal system and to shorten the dispersion time because of its strong adsorption force, and moreover, it is difficult to obtain a magnetic recording medium with an excellent surface smoothness, high degree of orientation and high reproducing output because a coating composition containing the ferromagnetic substance, after dispersed, is inferior in stability during the passage of time, resulting in immediate reaggregation.

SUMMARY OF THE INVENTION

It is an object of the present invention to provide a magnetic recording medium whereby the above described problems of the prior art can be overcome.

It is another object of the present invention to provide a magnetic recording medium in which the surface property of the coating film, the degree of orientation in a magnetic field and the reproducing output are improved by raising the dispersion of a coating composition, shortening the dispersion time and raising the stability of a coating composition during passage of time.

It is a further object of the present invention to provide a magnetic recording medium having a coating film with a higher gloss.

These objects can be attained by a magnetic recording medium comprising a non-magnetic support and a magnetic recording layer provided thereon containing a ferromagnetic substance of plate-shaped hexagonal crystal system, characterized in that the surface of the magnetic recording layer has a gloss value of at least 180%.

DETAILED DESCRIPTION OF THE INVENTION

The inventors have made various efforts to solve the problems of the prior art and consequently, have reached the present invention. Accordingly, the present invention provides a magnetic recording medium comprising a non-magnetic support and a magnetic recording layer provided thereon containing a ferromagnetic substance of plate-shaped hexagonal system and having a gloss value of 180% or more. The magnetic layer, whose surface has a gloss value of at least 180%, can, for example, be realized by incorporating at most 20% by weight, preferably 0.1 to 10% by weight of a non-magnetic filler, based on the ferromagnetic substance, in the magnetic layer.

The gloss value of the surface of a magnetic layer used in this specification is measured at an angle of incidence of 45° assuming the mirror surface gloss of a glass having a refractive index of 1.567 as 100% according to JIS Z 8741. In the present invention, a coating composition excellent in dispersion and having less tendency of aggregation is used to obtain a coating film with a decreased roughness and increased smoothness, i.e. higher gloss value.

As the non-magnetic filler, there are generally used inorganic pigments, for example, calcium carbonate, berium sulfate, zinc oxide, titanium oxide, chrome yellow, cadmium yellow, nickel titan yellow, naples yellow, yellow iron oxide, iron oxide red, cadmium red, iron blue, ultramarine blue, molybdate orange, mercury sulfide cadmium and the like. A non-magnetic filler having a grain size of at most 1 $\mu$m, preferably 0.01 to 0.5 $\mu$m, more preferably 0.03 to 0.2 $\mu$m is used. The amount thereof is generally at most 20% by weight, preferably 0.1 to 10% by weight, more preferably 0.5 to 5% by weight, based on the ferromagnetic substance. Particularly preferable inorganic pigments are calcium carbonate, barium sulfate, zinc oxide, chrome yellow and cadmium red.

Examples of the ferromagnetic substance of plate-shaped hexagonal system having the axis of easy magnetization in the vertical direction to the plate surface, used in the present invention, are hexagonal ferrite powders such as powders of barium ferrite, strontium ferrite, lead ferrite and calcium ferrite, manganess bismuth and hexagonal cobalt alloys. Above all, Co-substituted products of barium ferrite and strontium ferrite are more preferable. The hexagonal and plate-shaped ferromagnetic substance of the present invention has preferably a plate diameter (mean grain diameter) of 0.01 to 10 μm, more preferably 0.03 to 0.10 μm and a plate thickness (mean thickness) of 0.003 to 5 μm, more preferably 0.015 to 0.05 μm, and can be prepared by any of known methods. The plate-shaped ratio (plate diameter/plate thickness) is preferably 2 or more, more preferably 3 to 10.

The ferromagnetic substance of plate-shaped hexagonal system has a coercive force Hc of 400 to 2,000 Oe, preferably 500 to 1,500 Oe and a saturation magnetization of at least 30 emu/g, preferably 50 to 65 emu/g.

In addition to the above described ferromagnetic substance, optionally, binders and additives such as dispersing agents, lubricants, abrasives, antistatic agents and the like can be added to the magnetic layer of the present invention.

Suitable binders which can be used in the present invention include hitherto known thermoplastic resins, thermosetting resins and mixtures thereof.

Suitable thermoplastic resins are those which have a suftening point of about 150° C. or lower, a mean molecular weight of about 10,000 to 200,000 and a degree of polymerization of about 200 to 2,000, for example, vinyl chloride-vinyl acetate copolymers, vinyl chloride-vinyl acetate-maleic acid copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate, cellulose diacetate, cellulose triacetate, cellulose propionate, nitrocellulose and the like, styrene-butadiene copolymers, polyester resins, various synthetic rubber based thermoplastic resins such as polybutadiene, polychloroprene, polyisoprene and styrene-butadiene copolymers, and mixtures thereof.

Suitable thermosetting resins have a molecular weight of about 200,000 or less as a coating liquid, and when coated and dried, the molecular weight becomes infinity due to reactions such as condensation, addition and the like. Of these resins, preferred resins are those which do not soften or melt before the resin thermally decomposes. Representative examples of these resins are phenol-formalin novolak resins, phenol-formalin resol resins, phenol-furfural resins, xylene-formaldehyde resins, urea resins, melamine resins, drying oil-modified alkyd resins, carbolic acid-modified alkyd resins, maleic acid-modified alkyd resins, unsaturated polyester resins, epoxy resins and hardeners such as polyamines, acid anhydrides, polyamide resins and the like, terminal isocyanate polyester resins of moisture hardening type terminal isocyanate polyether resins of moisture hardening type, polyisocyanate prepolymers such as compounds having three or more isocyanate groups in one molecule obtained by reaction of diisocyanates and low molecular weight triols, trimers and tetramers of diisocyanates, polyisocyanate prepolymers and resins having active hydrogens such as polyester polyols, polyether polyols, acrylic acid copolymers, maleic acid copolymers, 2-hydroxyethyl methacrylate copolymers, p-hydroxystyrene copolymers and the like, and mixtures thereof.

Of these binders, vinyl chloride-vinyl acetate copolymers, vinyl chloride-vinyl acetate-maleic acid copolymers, vinyl chloride-vinylidene chloride copolymers and vinyl chloride-acrylonitrile copolymers are preferably used with best results in combination with the ferromagnetic substances of the present invention.

These binders can be used individually or in combination with each other and other additives can be added to the binders. The mixing ratio by weight of the ferromagnetic substance and binder is 8 to 400 parts by weight, preferably 10 to 200 parts by weight of the binder to 100 parts by weight of the ferromagnetic substance.

Suitable dispersing agents (pigment wetting agents) are fatty acids containing about 12 to 18 carbon atoms represented by the general formula $R_1COOH$ wherein $R_1$ is an alkyl or alkenyl group containing about 11 to 17 carbon atoms, for example, caprylic acid, capric acid, lauric acid, myristic acid, plamitic acid, stearic acid, oleic acid, elaidic acid, linolic acid, linolenic acid, stearolic acid and the like; metallic soaps comprising the alkali metal salts (Li, Na, K, etc.) salts or alkaline earth metal (Mg, Ca, Ba, etc.) salts of the above described fatty acids; fluorine-containing compounds of the above described fatty acids ester; amides of the above described fatty acids; polyalkylene oxide alkylphosphoric acid esters; lecithin; trialkyl polyolefinoxy quaternary ammonium salts (alkyl: $C_1$–$C_5$; olefin: ethylene, propylene, etc.) and the like. In addition, higher alcohols containing 12 or more carbon atoms and sulfuric acid esters thereof can be used. These dispersing agents are generally used in a proportion of 0.5 to 20 parts by weight to 100 parts by weight of the binder.

Suitable lubricants which can be used in the present invention include silicone oils such as dialkylpolysiloxanes (alkyl: $C_1$–$C_5$), dialkoxypolysiloxanes (alkoxy: $C_1$–$C_4$), monoalkylmonoalkoxypolysiloxanes (alkyl: $C_1$–$C_5$; alkoxy: $C_1$–$C_4$), phenylpolysiloxanes and fluoroalkylpolysiloxanes (alkyl: $C_1$–$C_5$); electroconductive fine powders such as graphite powder; inorganic fine powders such as molybdenum disulfide and tungsten disulfide powders; plastic fine powders such as polyethylene, polypropylene, ethylene-vinyl chloride copolymers and polytetrafluoroethylene powders; α-olefin polymers; unsaturated aliphatic hydrocarbons liquid at normal temperature (wherein double bond of n-olefin is bonded to terminal carbon, number of carbon atoms: about 20) fatty acid esters of monobasic fatty acids of $C_{12}$–$C_{20}$ and monohydric alcohols of $C_3$–$C_{12}$; and fluorocarbons. These lubricants are generally used in a proportion of 0.2 to 20 parts by weight to 100 parts by weight of the binder.

Typical abrasive agents which can be used in the present invention include fused alumina, silicon carbide, chromium oxide ($Cr_2O_3$), corundum, diamond, synthetic corundum, synthetic diamond, garnet, emery (main component: corundum and magnetite) and the like. These abrasive agents have generally a Mohs' hardness of 5 or more and a mean grain size of 0.05 to 5 μm, more preferably 0.1 to 2 μm, and are generally used in a proportion of 0.5 to 20 parts by weight to 100 parts by weight of the binder.

Antistatic agents which can be used in the present invention include electroconductive fine powders such as carbon black and carbon black graft polymers; natural surface active agents such as saponin; nonionic surface active agents such as alkylene oxide based, glycerol based and glycidol based surface active agents; cationic surface active agents such as higher alkylamines, quaternary ammonium salts, heterocyclic compounds such as pyridine and the like, phosphonium or sulfonium salts and the like; anionic surface active agents containing acid groups such as carboxylic acid, sulfonic acid, phosphoric acid, sulfate, phosphate groups and the like; and amphoteric surface active agents such as amino acids, aminosulfonic acids and sulfuric acid or phosphoric acid esters of amino alcohols and the like.

The above described electroconductive fine powders are generally added in a proportion of 0.2 to 20 parts by weight to 100 parts by weight of the binder and the surface active agents are generally added in a proportion of 0.1 to 10 parts by weight to 100 parts by weight of the binder.

These surface active agents can be used individually or in combination with each other. These surface active agents are generally used as antistatic agents, but in some cases, they are used for other purposes, for example, for improving dispersibility, magnetic properties and lubricity, or as an auxiliary coating agent.

Formation of the magnetic layer used in the present invention is carried out by dispersing a ferromagnetic substance in a non-magnetic filler, binder, additive and solvent to prepare a coating composition, coating the resulting coating composition onto a support, subjecting to orientation and then drying. The ferromagnetic substance, non-magnetic filler, binder, dispersing agent, lubricant, abrasive, antistatic agent and solvent were blended and kneaded to prepare a magnetic coating composition. For kneading, the magnetic powder and other components as set forth above are charged in a kneading machine simultaneously or separately. For example, a magnetic powder is added to a solvent containing a dispersing agent and kneaded for a predetermined period of time to prepare a magnetic coating composition.

Various kneading machines are used for the kneading and dispersing of the magnetic coating composition, for example, two roll mills, three roll mills, ball mills, pebble mills, trommel mills, sand grinders, Szegvari attriters, high speed impeller dispersing machines, high speed stone mills, high speed impulse mill, high speed mixers, homogenizers, ultrasonic dispersing machines and the like. The kneading and dispersing techniques are described in T. C. Patton, "Paint Flow and Pigment Dispersion", published by John Wiley & Sons (1964) and U.S. Pat. Nos. 2,581,414 and 2,855,156.

For the purpose of obtaining a magnetic layer with a gloss value of at least 180%, it is preferable to provide a step of predispersing (blending or kneading) and step of mixing and dispersing. The predispersing step is generally carried out for 10 minutes to 20 hours, preferably 10 minutes to 12 hours using two roll mills, three roll mills, open kneader, press kneader or continuous kneader. The next mixing and dispersing step is generally carried out for 10 minutes to 60 hours, preferably 30 minutes to 20 hours using a sand grinder, ball mill or attriter.

The foregoing magnetic recording layer can be coated on a support using coating methods such as air doctor coating, blade coating, rod coating, extrusion coating, air knife coating, squeeze coating, dip coating, reverse roll coating, transfer roll coating, gravure coating, kiss coating, cast coating, spray coating, spin coating and the like, and other coating methods can also be used. These methods are described in "Coating Kogaku (Coating Engineering)", page 253-277, published by Asakura Shoten, Tokyo (Mar. 20, 1971).

The magnetic layer coated onto a support by the above described coating method is dried after, if necessary, the coating has been subjected to a treatment for orientating the magnetic substance in the layer. If necessary, the magnetic layer can be subjected to a surface-smoothening treatment or cut in a desired shape, thereby to form the magnetic recording medium of the present invention.

According to the present invention, in particular, it is found that when the magnetic layer is subjected to a surface-smoothening treatment, a magnetic recording medium can be obtained with a smooth surface as well as an excellent abrasion resistance. This surface smoothening treatment is carried cut by a smoothening treatment before drying or by a calendering treatment after drying. The calendering treatment is preferably carried out at a treatment temperature of 35° to 150° C., linear pressure of 25 to 500 kg/cm and speed of 5 to 200 m/min so as to adjust the gloss value to 180% or more.

As the support, there are used, for example, polyesters such as polyethylene terephthalate and polyethylene-2, 6-naphthalate, polycarbonates, polyamides, polyimides, polyamideimides, polyolefine such as polypropylene, cellulose derivatives such as cellulose triacetate and cellulose diacetate and the like.

When the above described non-magnetic support is in the form of a film, tape, sheet or card, it can be subjected to the so-called back coating at the opposite surface to a magnetic layer provided thereon for the purpose of preventing static charging, magnetic print through and wow and flutter, increasing the strength of the magnetic recording medium and matting the back surface.

This back layer is provided by mixing, kneading and dispersing at least one additive of lubricants, abrasives and antistatic agents described above and optionally a dispersing agent with a binder and coating solvent described above, and coating the resulting coating composition onto the back surface of a support as described above, followed by drying. Either of the above described magnetic layer and back layer can first be provided on a support.

The commonly used preferable additives are carbon black, graphite, talc, $Cr_2O_3$, $TiO_2$, $CaCO_3$, $\alpha$-$Fe_2O_3$ and silicone oils, which can be used individually or in combination. As the binder, the foregoing thermosetting resins are preferable.

The additives are added in a proportion of about 20 to 85% by weight, preferably 30 to 80% by weight to the whole solid content of the back layer in the case of inorganic compounds and in a proportion of about 0.1 to 30% by weight, preferably 0.2 to 20% by weight in the case of organic compounds. The thickness of the back layer, on dry basis, can suitably be chosen in the range of at most about 5 $\mu$m depending upon the total thickness, use, shape and object of the magnetic recording medium.

According to the present invention, the dispersion of a coating composition is improved by adding at most 20% by weight of a non-magnetic filler to the ferromagnetic substance of plate-shaped hexagonal crystal system, so that the coating composition is hardly aggregated and the stability thereof during passage of time is also improved. Consequently, there can be obtained a magnetic recording medium in which the surface smoothness of the coating is raised to give a gloss value of at least 180% and the reproducing output is improved.

The following examples are given in order to illustrate the present invention without limiting the same. It will be obvious to one skilled in the art that various changes and modifications can be made in the components, ratios, operational order and the like without departing from the spirit of the present invention. All parts in Examples are to be taken as those by weight, unless otherwise indicated.

EXAMPLE 1

| | |
|---|---|
| Co-substituted Ba Ferrite (plate-shaped grains with mean grain diameter of 0.1 μm, plate-shaped ratio of 3.3 and mean thickness of 0.03 μm; coercive force 660 Oe; saturation magnetization 58 emu/g) | 300 parts |
| Barium Sulfate (mean grain diameter 0.1 μm) | 6 parts |
| Graphite Powder | 15 parts |
| Vinyl Chloride-Vinylidene Chloride Copolymer (copolymerization ratio 80:20; molecular weight 45,000) | 45 parts |
| Amyl Stearate | 10 parts |
| Lecitin | 3 parts |
| Chromium Oxide ($Cr_2O_3$) | 5 parts |
| Methyl Ethyl Ketone | 300 parts |
| Toluene | 300 parts |

The above described components were mixed and dispersed with circulation in a sand grinder.

After dispersing, 50 parts of a polyester polyol was added thereto and uniformly mixed, to which 30 parts of a polyisocyanate was then added, and the resulting mixture was mixed and dispersed again in the sand grinder to prepare a hardenable magnetic coating composition. This coating composition was coated onto a polyethylene terephthalate film of 20 μm in thickness, subjected to a corona discharge treatment, to give a coating thickness of 4 μm on dry basis by means of a gravure roll and dried. Then, the thus coated film was subjected to a calendering treatment at a speed of 50 m/min under a linear pressure of 250 kg/cm at a temperature of 85° C. and slit to obtain a magnetic tape.

EXAMPLE 2

The procedure of Example 1 was repeated except that after the hardenable magnetic coating composition was coated, the resulting film, not dried, was subjected to orientation in a magnetic field with a strength of 3800 Oe in the vartical direction to the support surface, after which it was dried as such.

EXAMPLE 3

The procedure of Example 1 was repeated except using 6 parts of calcium carbonate (mean grain size 0.1 μm) instead of the barium sulfate.

EXAMPLE 4

The procedure of Example 2 was repeated except using 6 parts of calcium carbonate (mean grain diameter 0.1 μm) instead of the barium sulfate.

COMPARATIVE EXAMPLE 1

The procedure of Example 1 was repeated except adding no barium sulfate.

COMPARATIVE EXAMPLE 2

The procedure of Example 2 was repeated except adding no barium sulfate.

COMPARATIVE EXAMPLE 3

The procedure of Example 1 was repeated except adding 61 parts of barium sulfate.

COMPARATIVE EXAMPLE 4

The procedure of Example 2 was repeated except adding 61 parts of barium sulfate.

COMPARATIVE EXAMPLE 5

The procedure of Example 1 was repeated except adding 61 parts of calcium carbonate (mean grain diameter 0.1 μm).

COMPARATIVE EXAMPLE 6

The procedure of Example 2 was repeated except adding 61 parts of calcium carbonate (mean grain diameter 0.1 μm).

TABLE 1

Various Properties of Tapes

| | Dispersion[1] Time (hr) | Gloss Value (%) | Orientation[2] in Vertical Direction | Saturated[3] Magnetic Flux Density (emu/cc) | Output[4] (dB) |
|---|---|---|---|---|---|
| Example | | | | | |
| 1 | 10 | 210 | 0.55 | 107 | 0 |
| 2 | 10 | 200 | 0.88 | 107 | +1 |
| 3 | 10 | 215 | 0.55 | 108 | 0 |
| 4 | 10 | 200 | 0.86 | 108 | +1 |
| Comparative Example | | | | | |
| 1 | 15 | 170 | 0.53 | 110 | −1.5 |
| 2 | 15 | 170 | 0.75 | 110 | −1.5 |
| 3 | 8 | 155 | 0.55 | 90 | −3 |
| 4 | 8 | 165 | 0.85 | 90 | −3.5 |
| 5 | 8 | 165 | 0.55 | 91 | −3 |
| 6 | 8 | 160 | 0.85 | 91 | −3.5 |

Note:
[1] Dispersion time to obtain maximum gloss value
[2] Degree of orientation measured in vertical direction to support surface with diamagnetic correction
[3] Saturated magnetic flux density measured in vertical direction to support surface
[4] Relative value to output of Example 1 at 6.8 MHz obtained by measuring magnetic recording properties at a half speed (3.5 m/s) of β VTR using a remodeled video deck J-20 made by Sony Corporation As is evident from the results of Table 1, the magnetic tapes of Examples 1 to 4 each has a higher gloss value and higher output and Examples 2 and 4 are favourably compared with Comparative Example 2 as to the vertical orientation. Thus, it will be understood that the reproducing output can be increased by adding a non-magnetic filler.

EXAMPLE 5

| In this example, the following composition was used: | |
|---|---|
| Co-substituted Ba Ferrite (plate-shaped grains with mean grain diameter of 0.1 μm, plate-shaped ratio of 3.3 and mean thickness of 0.03 μm; coercive force 660 Oe; saturation magnetization 58 emu/g) | 300 parts |

-continued

| In this example, the following composition was used: | |
|---|---|
| Zinc Oxide (mean grain diameter 0.5 μm) | 6 parts |
| Graphite Powder | 15 parts |
| Vinyl Chloride-Vinylidene Chloride Copolymer (copolymerization ratio 80:20; molecular weight 45,000) | 45 parts |
| Amyl Stearate | 10 parts |
| Lecitin | 3 parts |
| Chromium Oxide ($Cr_2O_3$) | 5 parts |
| Methyl Ethyl Ketone | 300 parts |
| Toluene | 300 parts |

45 Parts of vinyl chloride-vinylidene chloride copolymer was firstly dissolved in 180 parts of methyl ethyl ketone and then kneaded with 300 parts of Co-substituted 13a ferrite, 6 parts of zinc oxide and 3 parts of lecitin in an open kneader. After 60 minutes from the start of the kneading, the mixture was adequately kneaded to be massive and the electric power required for the kneading reached a peack value. The kneading was further continued for 100 minutes after the electric power reached the value and thereafter, 50 parts polyester polyol, 10 parts of amyl stearate, 120 parts of methyl ethyl ketone, 300 parts of toluene, 15 parts of graphite powder and 5 parts of chromium oxide were added with continuing the kneading. The resulting mixture was further blended and dispersed for 10 hours and then mixed with 50 parts of polyisocyanate in a sand grinder to obtain a hardenable magnetic coating composition. This coating composition was coated onto a polyethylene terephthalate film of 20 μm in thickness, previously subjected to a corona discharge treatment, to give a coating thickness of 4 μm on dry basis by means of a gravure roll and dried. Then, the thus coated film was subjected three times to a calendering treatment at a speed of 50 m/min under a linear pressure of 250 kg/cm at a temperature of 85° C., and slit to obtain a magnetic tape.

EXAMPLE 6

The procedure of Example 5 was repeated except that after the hardenable magnetic coating composition was coated, the resulting film, not dried, was subjected to orientation in a magnetic field with a strength of 3800 Oe in the vertical direction to the support surface, after which it was dried as such.

EXAMPLE 7

The procedure of Example 5 was repeated except using 6 parts of chrome yellow (mean grain diameter 0.4 μm) instead of 6 parts of zinc oxide.

EXAMPLE 8

The procedure of Example 6 was repeated except using the magnetic hardenable coating composition of Example 7.

The various properties of the samples obtained in Examples 5 to 8 are shown in Table 2:

TABLE 2

| Example | Dispersion Time (hr) | Gloss Value (%) | Orientation in Vertical Direction | Saturated Magnetic Flux Density (emu/cc) | Output (dB) |
|---|---|---|---|---|---|
| 5 | 10 | 225 | 0.55 | 108 | +2 |
| 6 | 10 | 220 | 0.87 | 108 | +2.5 |
| 7 | 10 | 225 | 0.55 | 107 | +2 |
| 8 | 10 | 220 | 0.86 | 107 | +2.5 |

In these Examples, the magnetic tapes also exhibited excellent gloss values as well as high output.

What is claimed is:

1. A magnetic recording medium comprising a non-magnetic support and a magnetic recording layer provided thereon containing a ferromagnetic substance of plate-shaped hexagonal system and 0.1 to 20% by weight of a non-magnetic filler, based on the ferromagnetic substance, characterized in that the surface of the magnetic recording layer has a gloss value of at least 180% when measured at an angle of incidence of 45°, and based upon a glass having a retractive index of 1.567 as 100%.

2. The magnetic recording medium of claim 1, wherein the non-magnetic filler is at least one inorganic pigment selected from the group consisting of calcium carbonate, barium sulfate, zinc oxide, titanium oxide, chrome yellow, cadmium yellow, nickel titan yellow, naples yellow, yellow iron oxide, iron oxide red, cadmium red, iron blue, ultramarine blue, molybdate orange, mercury sulfide cadmium and mixtures thereof.

3. The magnetic recording medium of claim 1, wherein the non-magnetic filler has a grain size of at most 1 μm.

4. The magnetic recording medium of claim 1, wherein the ferromagnetic substance of plate-shaped hexagonal system is selected from the group consisting of barium ferrite, strontium ferrite, lead ferrite, calcium ferrite, manganess bismuth alloys, hexagonal cobalt alloys and mixtures thereof.

5. The magnetic recording medium of claim 1, wherein the ferromagnetic substance of plate-shaped hexagonal system is selected from the group consisting of Co-substituted barium ferrites, C-substituted strongtium ferrites and mixtures thereof.

6. The magnetic recording medium of claim 1, wherein the ferromagnetic substance of plate-shaped hexagonal system has a plate diameter of 0.01 to 10 μm and a plate thickness of 0.003 to 5 μm.

7. The magnetic recording medium of claim 6, wherein the plate-shaped ratio (plate diameter/plate thickness) is in the range of 3 to 10.

8. The magnetic recording medium of claim 1, wherein the ferromagnetic substance is dispersed in a binder with other additives.

9. The magnetic recording medium of claim 1, wherein the magnetic recording layer is orientated in the vertical direction to the non-magnetic support surface.

10. The magnetic recording medium of claim 1, wherein the ferromagnetic substance of plate-shaped hexagonal system has a coercive force of 400 to 2,000 Oe.

11. The magnetic recording medium of claim 1, wherein the ferromagnetic substance of plate-shaped hexagonal system has a saturation magnetization of at least 30 emu/g.

* * * * *